United States Patent
Dowling

(10) Patent No.: US 11,005,507 B2
(45) Date of Patent: May 11, 2021

(54) TARGETED RATIO OF SIGNAL POWER TO INTERFERENCE PLUS NOISE POWER FOR ENHANCEMENT OF A MULTI-USER DETECTION RECEIVER

(71) Applicant: Massachusetts Institute of Technology, Cambridge, MA (US)

(72) Inventor: Michael Dowling, Woburn, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/900,116

(22) Filed: Jun. 12, 2020

(65) Prior Publication Data
US 2020/0395965 A1    Dec. 17, 2020

Related U.S. Application Data

(60) Provisional application No. 62/861,569, filed on Jun. 14, 2019.

(51) Int. Cl.
*H03D 1/04* (2006.01)
*H04B 1/10* (2006.01)
*H04B 7/08* (2006.01)

(52) U.S. Cl.
CPC ............... *H04B 1/10* (2013.01); *H04B 7/088* (2013.01)

(58) Field of Classification Search
CPC .................................... H04B 1/10; H04B 7/08
USPC ........................................................ 375/346
See application file for complete search history.

(56) References Cited

U.S. PATENT DOCUMENTS

| | | |
|---|---|---|
| 6,487,414 B1 | 11/2002 | Tanay et al. |
| 6,704,376 B2 | 3/2004 | Mills et al. |
| 6,947,505 B2 | 9/2005 | Learned |
| 7,031,266 B1 | 4/2006 | Patel et al. |
| 7,058,422 B2 | 6/2006 | Learned et al. |
| 7,085,575 B2 | 8/2006 | Fabien et al. |

(Continued)

FOREIGN PATENT DOCUMENTS

| | | |
|---|---|---|
| WO | WO 2010/066289 A1 | 6/2010 |
| WO | WO 2011/006116 A1 | 1/2011 |

(Continued)

OTHER PUBLICATIONS

Ahmed, et al.; "Entropy Expressions and Their Estimators for Multivariate Distributions;" IEEE Transactions on Information Theory; vol. 35; No. 3; May 1989; 5 pages.

(Continued)

*Primary Examiner* — Helene E Tayong
(74) *Attorney, Agent, or Firm* — Daly, Crowley, Mofford & Durkee, LLP

(57) ABSTRACT

According to some embodiments, in a multi-user detection (MUD) receiver, a method for identifying a beam which produces a specific signal-to-interference-plus-noise ratio (SINR) can include: determining a maximum output SINR; determining beam weights to achieve a target SINR using the determined maximum output SINR; applying the beam weights to one or more received signals to generate a beamformed signal having the target SINR, one or more of the received signals having a signal of interest (SOI), one or more interfering signals, and noise; and providing the beamformed signal to a multi-user detection unit to recover the SOI.

18 Claims, 4 Drawing Sheets

(56) References Cited

U.S. PATENT DOCUMENTS

| | | |
|---|---|---|
| 7,092,452 B2 | 8/2006 | Taylor et al. |
| 7,126,890 B2 | 10/2006 | Learned et al. |
| 7,190,743 B2 | 3/2007 | Learned |
| 7,218,690 B2 | 5/2007 | Learned |
| 7,269,223 B2 | 9/2007 | Learned et al. |
| 7,558,238 B1 | 7/2009 | Sun et al. |
| 7,593,473 B2 | 9/2009 | Learned et al. |
| 7,593,492 B1 | 9/2009 | Lande et al. |
| 7,630,344 B1* | 12/2009 | Kilfoyle ............... H04B 1/7103 370/334 |
| 7,724,851 B2 | 5/2010 | Learned et al. |
| 7,738,906 B2 | 6/2010 | Attar et al. |
| 9,148,804 B2 | 9/2015 | Learned |
| 9,998,199 B2 | 6/2018 | Learned et al. |
| 10,091,798 B2 | 10/2018 | Learned et al. |
| 2001/0028675 A1 | 10/2001 | Bierly et al. |
| 2002/0002052 A1 | 1/2002 | McHenry |
| 2002/0122413 A1 | 9/2002 | Shoemake |
| 2004/0018843 A1 | 1/2004 | Cerwall et al. |
| 2004/0082363 A1 | 4/2004 | Hosein |
| 2004/0235472 A1 | 11/2004 | Fujishima et al. |
| 2005/0124347 A1 | 6/2005 | Hosein |
| 2005/0201280 A1 | 9/2005 | Lundby et al. |
| 2007/0086379 A1 | 4/2007 | Takayanagi et al. |
| 2008/0089279 A1 | 4/2008 | Hu et al. |
| 2008/0198828 A1 | 8/2008 | Reznik et al. |
| 2008/0293353 A1 | 11/2008 | Mody et al. |
| 2009/0154534 A1 | 6/2009 | Hassan |
| 2009/0190566 A1 | 7/2009 | Kwon et al. |
| 2009/0258597 A1 | 10/2009 | Chen et al. |
| 2010/0056140 A1* | 3/2010 | Hafeez ................. H04B 7/024 455/434 |
| 2010/0124930 A1 | 5/2010 | Andrews et al. |
| 2010/0142465 A1 | 6/2010 | Medepalli et al. |
| 2010/0165956 A1 | 7/2010 | Razzell |
| 2010/0289688 A1 | 11/2010 | Sherman et al. |
| 2010/0304770 A1 | 12/2010 | Wietfeldt et al. |
| 2011/0021153 A1 | 1/2011 | Safavi |
| 2011/0093540 A1 | 4/2011 | Eisenberg et al. |
| 2011/0176508 A1 | 7/2011 | Altintas et al. |
| 2011/0286351 A1 | 11/2011 | Reudink |
| 2012/0039183 A1 | 2/2012 | Barbieri et al. |
| 2012/0069941 A1 | 3/2012 | Herbig |
| 2012/0071102 A1 | 3/2012 | Palomar et al. |
| 2012/0108276 A1 | 5/2012 | Lang et al. |
| 2012/0208571 A1 | 8/2012 | Park et al. |
| 2013/0035108 A1 | 2/2013 | Joslyn et al. |
| 2013/0244681 A1 | 9/2013 | Ookubo et al. |
| 2014/0126488 A1 | 5/2014 | Learned |
| 2014/0293867 A1 | 10/2014 | Horiuchi et al. |
| 2014/0314003 A1 | 10/2014 | Zhou et al. |
| 2014/0348004 A1 | 11/2014 | Ponnuswamy |
| 2015/0049721 A1 | 2/2015 | Wijting et al. |
| 2015/0282176 A1 | 10/2015 | MacLeod et al. |
| 2015/0282189 A1 | 10/2015 | Learned et al. |
| 2018/0026741 A1* | 1/2018 | Deng ................... H04L 1/0015 370/329 |

FOREIGN PATENT DOCUMENTS

| | | |
|---|---|---|
| WO | WO 2011/055319 A1 | 5/2011 |
| WO | WO 2013/185150 A1 | 12/2013 |
| WO | WO 2014/052992 A1 | 4/2014 |
| WO | WO 2016/053406 A1 | 4/2016 |
| WO | WO 2016/053406 A9 | 4/2016 |
| WO | WO 2016/114844 A2 | 7/2016 |

OTHER PUBLICATIONS

Bahl, et al.; "Optimal Decoding of Linear Codes for Minimizing Symbol Error Rate;" IEEE Transactions on Information Theory; Mar. 1974; 4 pages.

Learned; "Making Optimal Use of the Asymmetric Inference Channel;" IEEE; Signals, Systems and Computers (Asilomar); Nov. 6-9, 2011; 6 pages.

Learned; "Making Optimal Use of the Asymmetric Interference Channel;" Asilomar Conference on Signals, Systems, and Computing; Presentation; Nov. 8, 2011; 63 pages.

Neeser, et al.; "Proper Complex Random Processes with Applications to Information Theory;" IEEE Transactions on Information Theory; vol. 39; No. 4; Jul. 1993; 10 pages.

Pham; "Fast Algorithms for Mutual Information Based Independent Component Analysis;" IEEE Transactions on Signal Processing; vol. 52; No. 10; Oct. 2004; 11 pages.

Tufts; "Design Problems in Pulse Transmission;" Technical Report 368; Massachusetts Institute of Technology; Jul. 28, 1960; 52 pages.

Tufts; "Nyquist's Problem—The Joint Optimization of Transmitter and Receiver in Pulse Amplitude Modulation;" Proceedings of the IEEE: vol. 53; Issue 3; 12 pages.

Ungerboeck; "Channel Coding with Multilevel/Phase Signals;" IEEE Transactions on Information Theory; vol. IT-28; No. 1; Jan. 1982; 13 pages.

Verdu; "The Capacity Region of the Symbol-Asynchronous Gaussian Multiple-Access Chanel;" IEEE Transactions on Information Theory; vol. 35; No. 4; Jul. 1989; 19 pages.

Boroson; "Sample Size Considerations for Adaptive Arrays;" IEEE Transactions on Aerospace and Electronic Systems; vol. AES-16; No. 4; Jul. 1980; 6 Pages.

Gu, et al; Robust Adaptive Beamforming Based on Interference Covariance Matrix Reconstruction and Steering Vector Estimation; IEEE Transactions on Signal Processing; vol. 60; No. 7; Jul. 2012; 5 Pages.

Massenga, et al; "Parameter Estimation in CDMA Multiuser Detection Using Cyclostationary Statistics;" Electronic Letters; vol. 32; No. 3; Feb. 1, 1996; 3 Pages.

White; "Artificial Noise in Adaptive Arrays;" IEEE Transactions on Aerospace and Electronic Systems; vol. AES-14; No. 2; Mar. 1978; 5 Pages.

* cited by examiner

TARGETED RATIO OF SIGNAL POWER TO INTERFERENCE PLUS NOISE POWER FOR ENHANCEMENT OF A MULTI-USER DETECTION RECEIVER

CROSS-REFERENCE TO RELATED APPLICATIONS

This application claims the benefit under 35 U.S.C. § 119 of provisional patent application No. 62/861,569 filed Jun. 14, 2019, which is hereby incorporated by reference herein in its entirety.

STATEMENT REGARDING FEDERALLY SPONSORED RESEARCH

This invention was made with Government support under Grant No. FA8702-15-D-0001 awarded by the U.S. Air Force. The Government has certain rights in the invention.

FIELD

The disclosure pertains generally to wireless communication, and more particularly to cognitive radio systems and techniques for achieving ad hoc wireless communications in the presence of other user interference (sometime referred to herein as "interference multiple access wireless communications").

BACKGROUND

As is known in the art, different wireless networks and/or systems of radios avoid interfering with each other by various options. For example, some systems rely on pre-arrangement or careful assignment of frequency bands, time slots, or signature pulses as is done for cellular systems through frequency reuse maps and TDMA for GSM, OFDMA for LTE, spread spectrum for IS-95, and combinations of these for WCDMA through HSPA commercial cellular standards. Other systems utilize collision avoidance techniques such as those employed for a packet based systems such as 802.11/16/22 (WiFi and WiMax) where collisions are controlled as part of a multiple access medium access control procedure (E.g. carrier sense multiple access). Still other systems utilize techniques for "on the fly" interference assessment and avoidance, such as dynamic spectrum access (DSA). This is done by the system of "secondary user" radios actively sensing the radio spectrum and coordinating to choose an empty band for transmission. Existing systems, however, fail if they are unable to avoid interference.

As the consumer market continues to rise for smart phones and wireless data service, the demand for more and more throughput increases and the radio spectrum becomes more crowded. A new paradigm in wireless communication is emerging where radios can be built to withstand interference to the level where interference is no longer avoided. Interference is allowed, even invited, to allow for more wireless devices to make use of the wireless spectrum. For example, the LTE Advanced standard (to support the HetNet feature) allows, even encourages, interference. If this new feature is enabled, reliable performance would require mobiles to have some kind of interference mitigation in the receivers.

Beamforming is a signal processing technique used in sensor arrays for directional signal transmission or reception. A receiver equipped with an array of antennas can employ any number of digital beamforming algorithms to direct a strong beam in particular direction (e.g., the direction of a particular transmitter) while directing deep nulls in other directions.

As may be understood from U.S. Pat. No. 10,091,798, to Learned and Kaminski, multiuser detection (MUD) on a channel may be performed using sequential/successive interference cancellation (SIC). A SIC MUD receiver estimates received signal parameters for an interfering signal, such as received amplitude, carrier frequency, phase, and baud timing. The receiver then demodulates the interfering signal, recreates it using the estimated parameters and demodulated symbol weights, and subtracts it from the received signal to recover (or "reveal") the signal of interest (SOI) underneath. This "cleaned up" received signal is then passed to a legacy receiver that works well in the absence of co-channel (same band) interference. U.S. Pat. No. 9,998,199, to Learned and Fiore, describe structures and techniques for use with MUD receivers including SIC MUD receivers. U.S. Pat. Nos. 10,091,798 and 9,998,199 are hereby incorporated by reference herein in their entireties.

SUMMARY

Performing conventional beamforming followed by successive interference cancellation (SIC) may be suboptimal. For example, SIC MUD receivers may perform well when the strength of an interfering signal is actually significantly higher than that of a SOI. Prior attempts at finding a suitable (and, ideally, an optional) MUD-enhancing beam have included iteratively searching and grading beams. It is appreciated herein that performing such an exhaustive search of beams can be inefficient and, in some applications, it may be preferable to target a specific signal-to-interference-plus-noise ratio (SINR) without employing an exhaustive search.

Disclosed herein are techniques for finding, in a closed-form manner, a beam that can achieve a target signal-to-interference-plus-noise ratio (SINR) value without significantly degrading the signal-to-noise ratio (SNR) of a SOI. This approach can result in fewer computations compared to existing techniques and offers the potential for enhanced performance and accuracy of a MUD algorithm since an SINR level advantageous for a particular MUD algorithm and/or operating environment can be directly targeted.

According to one aspect of the disclosure, in a multi-user detection (MUD) receiver, a method for identifying a beam which produces a specific signal-to-interference-plus-noise ratio (SINR) includes: determining a maximum output SINR; determining beam weights to achieve a target SINR using the determined maximum output SINR; applying the beam weights to one or more received signals to generate a beamformed signal having the target SINR, one or more of the received signals comprised of a signal of interest (SOI), one or more interfering signals, and noise; and providing the beamformed signal to a multi-user detection unit to recover the SOI.

According to another aspect of the disclosure, a system can include: a plurality of antenna elements; a front end unit coupled to receive signals from the plurality of antenna elements and configured to down covert the received signals, one or more of the down converted signals comprised of a signal of interest (SOI), one or more interfering signals, and noise; and a beam determination unit configured to determine a maximum output SINR determine beam weights to achieve a target SINR using the determined maximum output SINR; a beamformer coupled to receive the down converted signals from the front end unit and configured to apply the beam weights to the down converted signal to generate a beamformed signal having the target SINR; and a multi-user detection (MUD) unit couple to receive the beamformed signal and configured to recover the SOI therefrom.

In some embodiments, determining the maximum output SINR can include determining beam weights that maximize SINR. In some embodiments, determining the beam weights that maximize SINR can include using at least one of: minimum variance distortion-less response (MVDR) beamforming; space time adaptive processing (STAP) beamforming; or space time frequency adaptive processing (STFAP) beamforming. In some embodiments, determining the maximum output SINR can include estimating the maximum output SINR using a closed form solution. In some embodiments, determining the maximum output SINR further can include applying the beam weights that maximize SINR to a model of the SOI and a model of the noise plus interference to determine the maximum output SINR. In some embodiments, determining the maximum output SINR can include: applying the beam weights that maximize SINR to the received signals to obtain signal samples; and determining the maximum output SINR using the obtained signal samples.

In some embodiments, determining the beam weights to achieve the target SINR can include: estimating a correlation matrix of noise plus interference; estimating a steering vector for the SOI; determining a first basis vector using the correlation matrix and the estimated SOI steering vector; selecting a second basis vector; determining a target scale factor based on the target SINR and the estimated maximum output SINR; transforming a two-dimensional vector containing the target scale factor using the first and second basis vectors; and determining the beam weights using the transformed two-dimensional vector and the estimated correlation matrix. In some embodiments, selecting the second basis vector can include selecting the second basis vector with the object of minimally degrading a signal-to-noise ratio (SNR) of the SOI using a Gram-Schmidt technique. In some embodiments, the multi-user detection unit is configured to recover the SOI using successive interference cancellation (SIC).

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the present disclosure, some introductory concepts and terminology are explained.

Communicating data from one location to another requires some form of pathway or medium between the two locations. In telecommunications and computer networking, a communication channel, or more simply "a channel," refers to a connection between two locations over a transmission medium. The connection may, for example, be a logical connection and the transmission medium may be, for example, a multiplexed medium such as a radio channel. A channel is used to convey an information signal, for example a digital bit stream, from one or several sources or sending nodes (or more simply sources or transmitters) to one or several destinations or receiving nodes (or more simply destinations or receivers). Regardless of the particular manner or technique used to establish a channel, each channel has a certain capacity for transmitting information, often measured by its frequency bandwidth in Hz or its data rate in bits per second.

Figure 1:
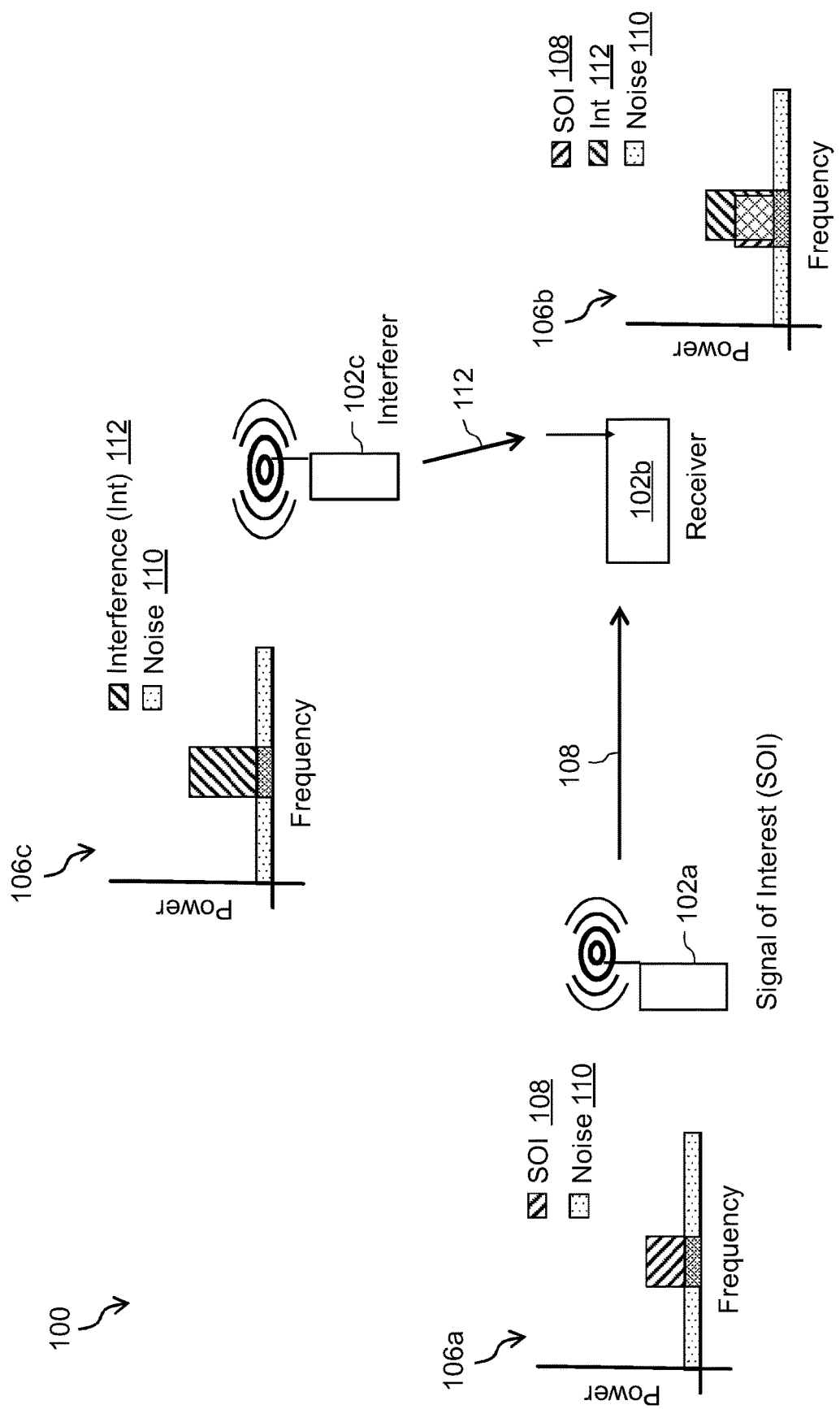
FIG. 1 is a diagram showing a communications environment, or network, in which the disclosed subject matter can be embodied.

Referring to FIG. 1, a communications environment, or network, 100 can include a plurality of radios, or nodes, 102a, 102b, 102c, etc. (102 generally). While only three nodes 102 are shown in FIG. 1 for clarity, the disclosed subject matter can be applied to environments with an arbitrary number of radios.

In the example of FIG. 1, a first radio 102a can transmit a signal of interest (SOI) 108 to a second radio, or receiver, 102b. If there were no other users in the channel, the receiver 102b would see the SOI 108 plus noise 110 generated by the receiver's processing chain, as illustrated by power spectrum 106a. A third radio 102c can transmit an interference signal 112 (i.e., a signal not of interest to receiver 102b), which can be overheard by receiver 102b. If there were no other users in the channel, the receiver 102b would see the interference signal 112 plus noise 110 generated by the receiver's processing chain, as illustrated by power spectrum 106c. When radios 102a and 102c both transmit in the same channel, receiver 102b sees the SOI 108, the interference signal 112, and noise 110 generated by the receiver's processing chain, as illustrated by power spectrum 106b. By definition, interference signal 112 occupies the same channel (or "band"), or at least a portion of the same band, at the same time as SOI 108. In some embodiments, first radio 102a and third radio 102c may intentionally transmit in the same channel. In other embodiments, such channel interference may be unintentional.

In the simplified example of FIG. 1, first radio 102a may be referred to as a "radio of interest" from the perspective of second radio 102b. That is, a "radio of interest" refers to a radio that transmits a SOI. In the case of bidirectional communication, two or more radios can be mutual radios of interest in that they each transmit and receive signals of interest. Mutual radios of interest are sometimes referred to as a "user" of a channel. An interferer transmitting in the same band may be considered a separate user ("interference user") of the channel.

In a conventional radio, interference may be treated as unstructured noise, making it difficult if not impossible for the conventional radio to detect a SOI. However, a MUD receiver can allow for successful communication in the same band as an interferer because a MUD receiver can effectively remove interference caused by the interferer and help the receiver "see through" that interference in order to detect the SOI. Thus, in some embodiments, receiver 102b can include a MUD receiver and, more particularly, a SIC MUD receiver. Disclosed embodiments allow for different radios to operate on the same channel at the same time, allowing users to occupy the same spectrum without having to increase the bandwidth allocation.

As seen by receiver 102b, the power of the SOI 108 divided by the sum of the interference power (from all the other interfering signals, such as signal 112) and the power of the background noise may be referred to as the signal-to-interference-plus-noise ratio (SINR). Different SINR values may be more or less favorable to the MUD algorithm within receiver 102b.

Figure 2:
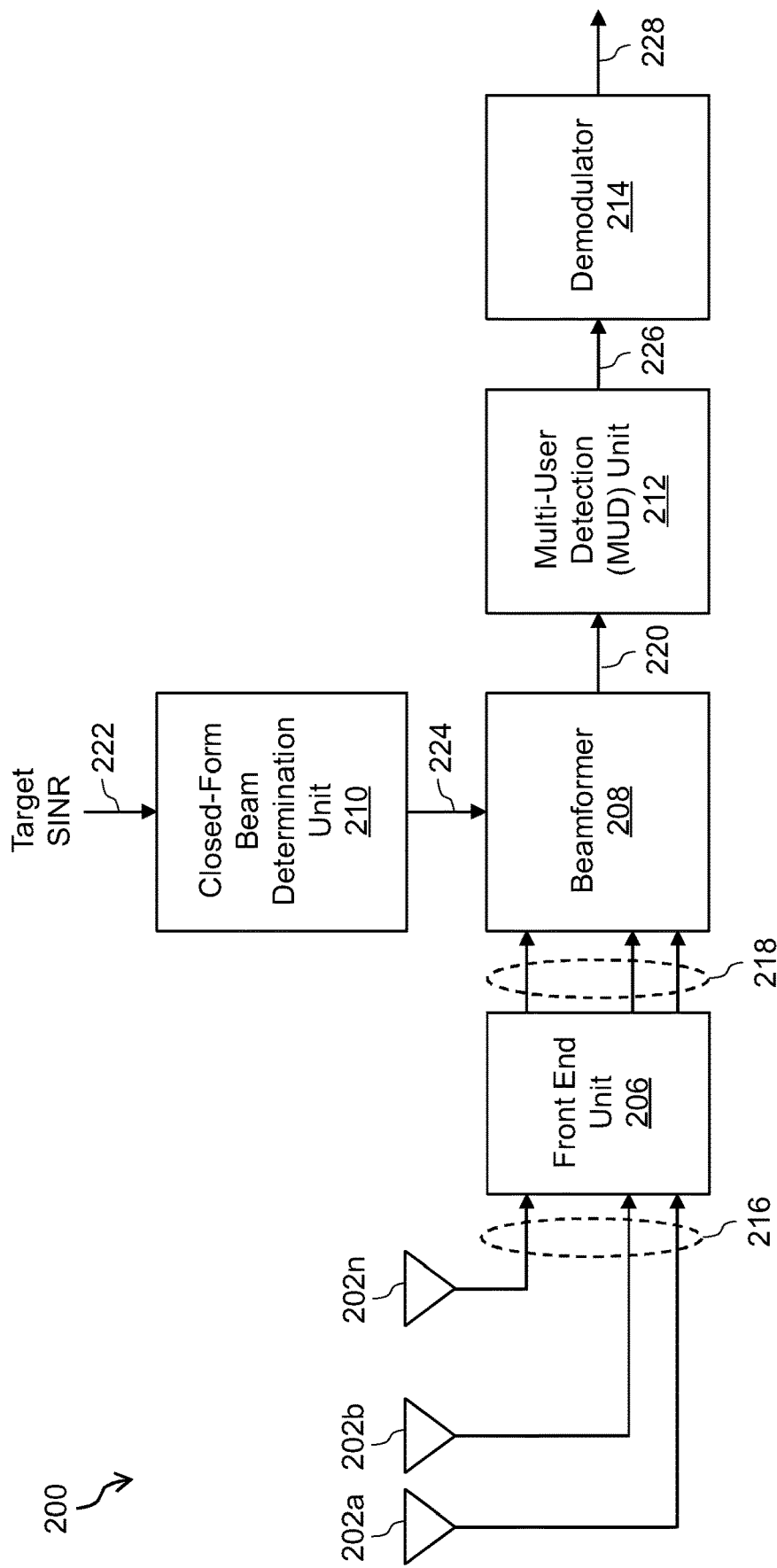
FIG. 2 is a block diagram of receiver system, according to some embodiments of the present disclosure.

Turning to FIG. 2, a receive system 200 according to some embodiments can include a plurality of antennas elements 202a, 202b, . . . , 202n (202 generally), front end unit 206, a beamformer 208, a closed-form beam determination unit 210, a MUD unit 212, and a demodulator 214. As used herein, the "unit" refers to a collection of hardware and/or software configured to perform and execute the processes, steps, or other functionality described in conjunction therewith. Receive system 200 can be used to receive a SOI within an interference channel, such as is described above in the context of FIG. 1. While system 200 is described herein as a receive system, the general concepts and structures described herein can also be implemented within a transmit system or a transmit-receive system. The various components of receive system 200 can be coupled together as shown in FIG. 2 or in any other suitable manner.

Antenna elements 202 can intercept propagated electromagnetic (EM) waves, e.g., EM waves propagated by a radio of interest in addition to waves propagated by one or more interferers. In some embodiments, antenna elements 202 may be provided as an antenna array. Antenna elements 202 can be connected to front end unit 206 via signal paths (or "lines") 216.

Front end unit 206 can include conventional front end radio components to capture a received RF signal within a particular RF band. In some embodiments, a wideband front end may be used to capture signals within multiple RF bands at the same time. In some embodiments, front end unit 206 may down convert and/or digitize the captured RF signals. Front end unit 206 can include, for example, a mixer for baseband sampling, a low pass filter (LPF), an automatic gain controller (AGC), and an analog to digital (ADC) converter. Front end unit 206 can provide, as output, down converted signals 218 to beamformer 208. For convenience, a signal carried on a particular signal path/line may be referred to herein using the signal path's reference number shown in FIG. 2. While a single front end unit 206 is shown in FIG. 2, in other embodiments, different antenna elements 202 can be coupled to different front end units.

Beamformer 208 can amplify the down converted signals 218 according to a given set of beam weights (e.g., a weighting vector) to achieve a desired directional sensitivity pattern or "beam." The beam weights can be calculated by closed-form beam determination unit ("beam determination unit" for brevity) 210 and provided to beamformer via line 224. The resulting beamformed signal 220 can be provided to MUD unit 212. Beamformer 208 can be provided as an analog, digital, or hybrid beamformer. In the case of an analog beamformer, the order of front end unit 206 and beamformer 208 in the receive chain may be swapped.

Beam determination unit 210 can receive a target SINR 222 as input. Beam determination unit 210 can then compute beam weights to achieve the target SINR 222 according to the processes described below in the context of FIGS. 3 and 3A. The target SINR 222 can be user-defined or selected based on the type of MUD algorithm used or other operational or application-specific factors. For example, target SINR 222 can be value that enables MUD unit 212 to recover a SOI in the presence of one or more interfering signals.

MUD unit 212 can be configured to perform multi-user detection (MUD) on the beamformed signal 220 using one or more MUD processing techniques or algorithms. In some embodiments, SIC MUD unit 212 may be configured to perform sequential interference cancellation (SIC). In some embodiments, MUD unit 212 can estimate received signal parameters for one or more interfering signals, such as received amplitude, carrier frequency, phase, and baud timing. The MUD unit 212 can demodulate the interfering signals and recreate them using the estimated parameters and demodulated symbol weights. Using the estimated signal parameters and demodulated symbols, MUD unit 212 can create an estimate of the received interfering signals and subtract them from the received signal to reveal a SOI underneath. This "cleaned up" received signal 226 can then be passed to demodulator 214.

Demodulator 214 can include circuitry to receive and demodulate the cleaned up signal 226 and, in response, generate a demodulated and decoded bit stream 228 as output. Decoded bit stream 228 can represent decoded packets/frames associated with the transmission from a radio of interest. The decoded bit stream 228 can be processed by additional hardware and/or software components of a receiver not shown in FIG. 2.

Figure 3:
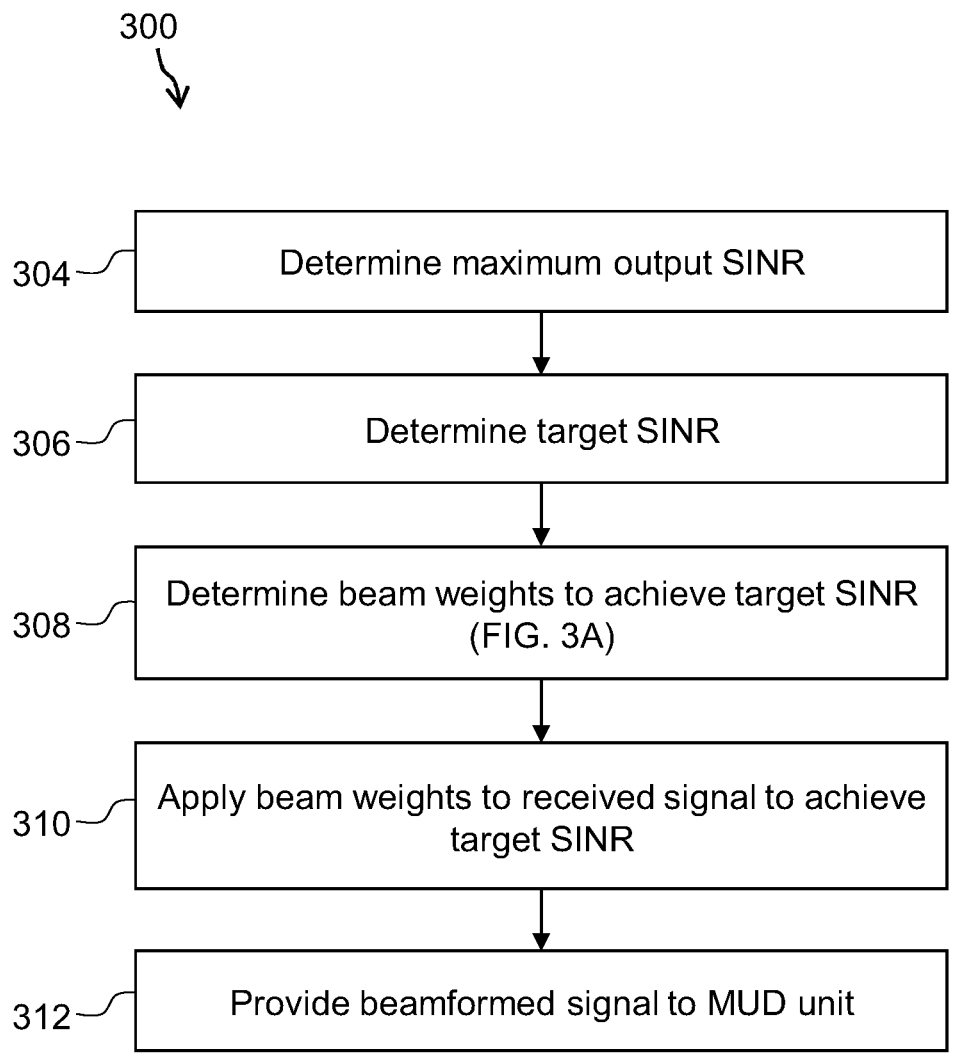
FIGS. 3 and 3A are flow diagrams showing processes for computing beam weights to achieve a target the signal-to-interference-plus-noise ratio (SINR) value, according to some embodiments.
Figure 3A:
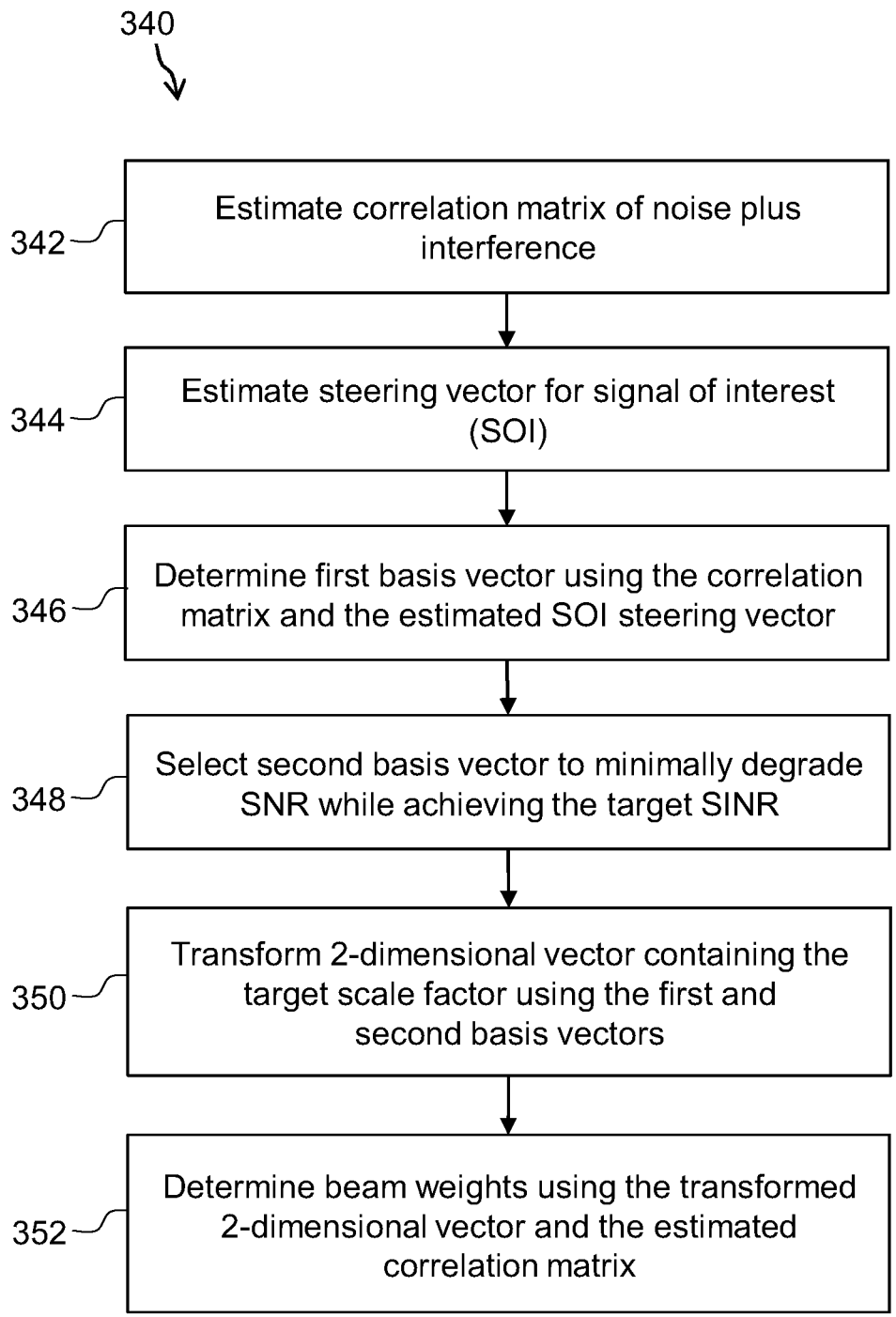

FIGS. 3 and 3A shows illustrative processes for computing beam weights to achieve a target the signal-to-interference-plus-noise ratio (SINR). The illustrated processing can be implemented within a radio system, such as receive system 200 of FIG. 2. In some embodiments, the processing can be implemented within a closed-form beam determination unit, such as unit 210 of FIG. 2. Blocks within the flow diagrams represent steps that can be performed by computer software instructions or by functionally equivalent circuits such as a digital signal processor (DSP) circuit or an application specific integrated circuit (ASIC). The sequence of blocks in a flow diagram is merely illustrative and, unless otherwise stated, the functions represented by the blocks can be performed in any convenient or desirable order.

A mathematical model for two simultaneously transmitted narrowband signals arriving on each of M antennas is as follows:

$$r_1(t) = A_{1,1}e^{2\pi i\theta_{1,1}}s_1(t) + A_{1,2}e^{2\pi i\theta_{1,2}}s_2(t) + n_1(t) \qquad (1)$$
$$r_2(t) = A_{2,1}e^{2\pi i\theta_{2,1}}s_1(t) + A_{2,2}e^{2\pi i\theta_{2,2}}s_2(t) + n_2(t)$$
$$\vdots$$
$$r_M(t) = A_{M,1}e^{2\pi i\theta_{M,1}}s_1(t) + A_{M,2}e^{2\pi i\theta_{M,2}}s_2(t) + n_M(t),$$

where $r_i(t)$ denotes the signal received at antenna i, $s_j(t)$ denotes the unit-amplitude signal transmitted by terminal j, $A_{i,j}$ denotes the amplitude of the signal $s_j(t)$ on antenna i, $\theta_{i,j}$ denotes the phase offset of $s_j(t)$ due to the time delay of the signal to antenna i, and $n_i(t)$ denotes the Additive White Gaussian Noise (AWGN) noise process with variance $\sigma_i^2$ on antenna i.

For simplicity in what follows, it is assumed that the noise is independent across antenna elements (e.g., antenna elements 202 in FIG. 2) and that the noise power spectral density is the same over all antennas. The noise variance is denoted as $\sigma^2$. Re-writing the model in (1) in vector notation gives $$r(t)=a_1s_1(t)+a_2s_2(t)+n(t), \qquad (2)$$

where $$r(t)=[r_1(t),r_2(t),\ldots,r_M(t)]^T,$$

$$a_j(t)=[A_{1,j}e^{2\pi i\theta_{1,j}},A_{2,j}e^{2\pi i\theta_{2,j}},\ldots,A_{M,j}e^{2\pi i\theta_{M,j}}]^T,$$

and $$n(t)=[n_1(t),n_2(t),\ldots,n_M(t)]^T.$$

The normal direction of the plane wave corresponding to the signal $s_j(t)$ (in some specified reference coordinate system) can be denoted by the 3×1 unit-norm vector $\phi_j$, and the locations of the M antenna elements can be denoted by the 3×1 vectors $x_1, x_2, \ldots, x_M$ (in the same coordinate system). Then, the angles in (2) are given by $$\theta_{i,j} = \frac{2\pi f_c (\phi_j \cdot x_i)}{c}, \tag{3}$$

where $f_c$ denotes the carrier frequency, and c denotes the speed of light.

Beamforming can be described as applying an M×1 weight vector w to the received signal r(t) to obtain the output signal:

$$w^H r(t).$$

where the operator $(\cdot)^H$ is the Hermitian complex conjugate transpose operation. Conventionally, this weight vector can be is chosen to maximize gain on a SOI while reducing gain on an interfering signal (i.e. maximizing SINR). While the disclosed subject matter allows targeting arbitrary SINR values (e.g., SINR values that are favorable to a MUD algorithm), a description of a closed-form solution to achieving maximum SINR is first discussed.

Because the derivation above assumes a narrowband signal, the carrier frequency $f_c$ is taken to be a fixed constant instead of ranging over the bandwidth of the signal. While the approach below is described for a narrowband signal, the overall approach also applies to a wideband signal using an enhanced correlation matrix employing time and/or Doppler taps.

Suppose that $s_1(t)$ is the SOI with steering vector $a_1$, that $s_2(t)$ is an interfering signal with steering vector $a_2$, and that the noise variance is $\sigma^2$. Then, the correlation matrix of the noise plus interference is given by $$R = a_2 a_2^H + \sigma^2 I,$$

where I denotes the M×M identity matrix. The correlation matrix R indicates the correlation of noise plus interference across multiple antenna elements In practice, correlation matrix R or an equivalent may be estimated. Examples of considerations and techniques for estimating this matrix are described in the following reference, which is hereby incorporated by reference in its entirety: [1] Y. Gu and A. Leshem, "Robust Adaptive Beamforming Based on Interference Covariance Matrix Reconstruction and Steering Vector Estimation," in IEEE Transactions on Signal Processing, vol. 60, no. 7, pp. 3881-3885, July 2012, doi: 10.1109/TSP.2012.2194289. In the following sections, an estimate of R is assumed irrespective of the particular method with which it is estimated.

Maximizing the SINR is equivalent to maximizing the following ratio:

$$\frac{|(R^{1/2}w)^H(R^{-1/2}a_1)|^2}{\|R^{1/2}w\|^2}. \tag{4}$$

This ratio arises from "whitening" the original problem. In particular, suppose that the received signal vector is given by $$r(t) = a_1 s_1(t) + a_2 s_2(t) + n(t),$$

where $a_1$ denotes the array steering vector associated with the SOI, $a_2$ denotes the array steering vector associated with the interference, and n(t) denotes the AWGN noise. Multiplying equation (2) by $R^{-1/2}$ yields $$R^{-1/2}x(t) = R^{-1/2}a_1 s_1(t) + [R^{-1/2}(a_2 s_2(t) + n(t))]. \tag{5}$$

As a result, the autocorrelation matrix of the bracketed terms is a diagonal matrix. With this setup, the weight can be easily chosen.

Equation (4) is maximized when $R^{1/2}w = R^{-1/2}a_1$, so setting $w = R^{-1}a_1$ maximizes the output SINR.

The preceding description relates to maximizing the output SINR, which can be seen as the conventional approach to beamforming. However, as previously discussed, this conventional approach may be suboptimal when the resulting beamformed signal is subsequently processed using a MUD algorithm such as SIC.

A target SINR can be defined as a scalar multiple (or "scale factor") of the maximum SINR (e.g., ½ the maximum SINR). If $R^{-1/2}a_1 = [1,0,0]^T$, then setting $R^{1/2}w = [1/\sqrt{2}, 1/\sqrt{2}, 0]^T$ can achieve half of the maximum SINR at the output of the beamformer. This is the approach taken with a change-of-basis implementation.

As in equation (5), the signal steering vector $a_1$ is multiplied by the whitening matrix $R^{-1/2}$. Denote the resulting vector by $\hat{a}_1$. Set $b_1 = \hat{a}_1 / \|\hat{a}_1\|^2$ as the first basis vector in the new basis. In this new basis, $\hat{a}_1$ can be represented as $[1, 0, \ldots, 0]^T$ as desired. To obtain the second element of the basis, in some embodiments, the Gram-Schmidt method with $R^{1/2}a_1$ as its input can be utilized. Subtracting off the component of $R^{1/2}a_1$ that lies along the direction given by $\hat{a}_1$ yields $$b = R^{1/2}a_1 - (\hat{a}_1^H a_1)\hat{a}_1.$$

In other embodiments, the Gram-Schmidt method can be initialized with the eigenvector corresponding to the largest eigenvalue of R. Next, the following can be normalized:

$$b_2 = \frac{b}{\|b\|^2}$$

The first two elements of the new basis are $b_1$ and $b_2$, which can be combined into a matrix $$B = [b_1, b_2].$$

Suppose that ½ of the maximum SINR is the target. Then, let $R^{1/2}w = B[1/\sqrt{2}, 1/\sqrt{2}]^T$, where multiplying by B transforms $[1/\sqrt{2}, 1/\sqrt{2}, 0, \ldots, 0]^T$ into the new basis. To produce a final set of beam weights, multiply $B[1/\sqrt{2}, 1/\sqrt{2}]^T$ by $R^{-1/2}$.

Turning to FIG. 3, a process 300 can begin at block 304 by estimating, measuring, or otherwise obtaining a maximum output SINR. The maximum output SINR is the SINR achieved when the beamformer weighting is selected to maximize gain on a SOI while reducing gain on one or more interfering signals. An a priori or an a posteriori method can be used to determine the maximum output SINR.

A priori, the maximum output SINR can be estimated/predicted by applying derived SINR-maximizing beam weights to the modeled SOI (e.g., $a_1 s_1(t)$ above) and modeled noise plus interference (e.g., $a_2 s_2(t)$ and n(t) above), and taking the ratio of the power of the respective outputs. The SINR-maximizing beam weights are the beam weights that maximize gain on a SOI while reducing gain on one or more interfering signals. The SINR-maximizing beam weights can be derived using a known technique such as minimum variance distortion-less response (MVDR) beamforming, space time adaptive processing (STAP) beamforming, or space time frequency adaptive processing (STFAP) beamforming. The a priori approach may be referred to as a closed form solution to determining the maximum output SINR.

A posteriori, the maximum output SINR can be determined by applying the SINR-maximizing beam weights to a received signal and then taking sample measurements (e.g., from digital samples of signals 218 in FIG. 2). This approach measures the actual SINR after applying the beam weights. Assuming the interference is Gaussian, a technique such as maximum-likelihood (ML) estimation or second- and fourth-order moments (M2M4) estimation can be used to determine the maximum output SINR. For some modulation formats, known cyclostationary methods can be employed to estimate SINR after applying beam weights, such as those described in the following reference, which is hereby incorporated by reference in its entirety: [2] F. Mazzenga and F. Vatalaro, "Parameter estimation in CDMA multiuser detection using cyclostationary statistics," in Electronics Letters, vol. 32, no. 3, pp. 179-181, 1 Feb. 1996, doi: 10.1049/el:19960167.

At block 306, a target SINR can be determined. As previously discussed, the target SINR can be user-defined or selected based on the type of MUD algorithm used or other operational or application-specific factors. In some embodiments, techniques described in U.S. Pat. No. 9,998,199 can be used to determine a target SINR for a particular MUD algorithm.

Block 308 includes determining beam weights (e.g., a vector of weights) to achieve the target SINR. The beam weights can be computed using a target scale factor, which is based on the target SINR. In particular, the target scale factor can be calculated from the estimated maximum output SINR (block 304) and the target SINR (block 306). Detailed procedures for computing beam weights to achieve the target SINR are described above and also below in the context of FIG. 3A.

At block 310, the beam weights can be applied to a received signal to achieve the target SINR. For example, referring briefly to FIG. 2, beam weights 224 can be used by beamformer 208 to amplify down converted signals 218, resulting in a beamformed signal 220 that has the target SINR.

At block 312, the beamformed signal can be provided to a MUD unit, such as MUD unit 212 of FIG. 2.

FIG. 3A shows an illustrative process 340 for determining beam weights to achieve the target SINR. Process 340 can be used in combination with process 300 (e.g., process 340 can be performed as part of block 308).

At block 342, a correlation matrix of noise plus interference (e.g., matrix R above) can be estimated using a known technique, as previously discussed.

At block 344, a steering vector for the SOI (e.g., vector $a_1$ above) can be estimated. In some embodiments, the SOI's steering vector can be estimated using pilot symbols, angle-of-arrival estimation, or other technique known in the art.

At block 346, a first basis vector (e.g., vector $b_1$ above) can be determined using the correlation matrix and the estimated SOI steering vector. In particular, the first basis vector ($b_1$) can be calculated by multiplying the inverse square root of the correlation matrix ($R^{-1/2}$) by the estimated SOI steering vector ($a_1$).

At block 348, a second basis vector (e.g., vector $b_2$ above) can be selected with the object of minimally degrading the SNR of the SOI. This can be accomplished using one of the Gram-Schmidt-based techniques described above, or any other method designed to minimally degrade the signal-of-interest SNR while targeting a particular SINR value. The two basis vectors can be combined into a matrix (e.g., matrix B above).

At block 350, a 2-dimension vector containing the target scale factor (e.g., the scale factor calculated from blocks 304 and 306, as previously discussed) can be formed. This 2-dimensional vector can be transformed into the basis represented by the first and second basis vectors or, equivalently, by basis matrix (B). Additional details for performing this transformation are provided above.

At block 352, the beam weights can be determined using the transformed 2-dimensional vector, from block 350, and the estimated correlation matrix, from block 342. For example, the beam weights can be calculated by multiplying the transformed 2-dimensional vector by the inverse square root of the correlation matrix ($R^{-1/2}$).

It is recognized that processes 300 and 340 can result in a beamformed signal that achieves a target SINR (e.g., a MUD-favorable SINR) without significantly degrading the SNR of the SOI.

Disclosed embodiments may be implemented in any of a variety of different forms. For example, disclosed embodiments can be implemented within various forms of communication devices, both wired and wireless, such as television sets, set top boxes, audio/video devices, smartphones, laptop computers, desktop computers, tablet computers, satellite communicators, cameras having communication capability, network interface cards (NICs) and other network interface structures, base stations, access points, and modems.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. In a multi-user detection (MUD) receiver, a method for identifying a beam which produces a specific signal-to-interference-plus-noise ratio (SINR), the method comprising:
    determining a maximum output SINR;
    determining beam weights to achieve a target SINR using the determined maximum output SINR;
    applying the beam weights to one or more received signals to generate a beamformed signal having the target SINR, one or more of the received signals comprised of a signal of interest (SOI), one or more interfering signals, and noise; and
    providing the beamformed signal to a multi-user detection unit to recover the SOI.

2. The method of claim 1, wherein determining the maximum output SINR comprises determining beam weights that maximize SINR.

3. The method of claim 2, wherein determining the beam weights that maximize SINR includes using at least one of:
    minimum variance distortion-less response (MVDR) beamforming;
    space time adaptive processing (STAP) beamforming; or
    space time frequency adaptive processing (STFAP) beamforming.

4. The method of claim 2, wherein determining the maximum output SINR includes estimating the maximum output SINR using a closed form solution.

5. The method of claim 2, wherein determining the maximum output SINR further comprises applying the beam weights that maximize SINR to a model of the SOI and a model of the noise plus interference to determine the maximum output SINR.

6. The method of claim 2, wherein determining the maximum output SINR comprises:
    applying the beam weights that maximize SINR to the received signals to obtain signal samples; and
    determining the maximum output SINR using the obtained signal samples.

7. The method of claim 1, wherein determining the beam weights to achieve the target SINR comprises:
    estimating a correlation matrix of noise plus interference;
    estimating a steering vector for the SOI;
    determining a first basis vector using the correlation matrix and the estimated SOI steering vector;
    selecting a second basis vector;
    determining a target scale factor based on the target SINR and the estimated maximum output SINR;
    transforming a two-dimensional vector containing the target scale factor using the first and second basis vectors; and
    determining the beam weights using the transformed two-dimensional vector and the estimated correlation matrix.

8. The method of claim 7, wherein selecting the second basis vector comprises selecting the second basis vector with the object of minimally degrading a signal-to-noise ratio (SNR) of the SOI using a Gram-Schmidt technique.

9. The method of claim 1, wherein the multi-user detection unit is configured to recover the SOI using successive interference cancellation (SIC).

10. A system comprising:
    a plurality of antenna elements;
    a front end unit coupled to receive signals from the plurality of antenna elements and configured to down covert the received signals, one or more of the down converted signals comprised of a signal of interest (SOI), one or more interfering signals, and noise;
    a beam determination unit configured to:
        determine a maximum output SINR, and
        determine beam weights to achieve a target SINR using the determined maximum output SINR;
    a beamformer coupled to receive the down converted signals from the front end unit and configured to apply the beam weights to the down converted signal to generate a beamformed signal having the target SINR; and
    a multi-user detection (MUD) unit couple to receive the beamformed signal and configured to recover the SOI therefrom.

11. The system of claim 10, wherein determining the maximum output SINR comprises determining beam weights that maximize SINR.

12. The system of claim 11, wherein determining the beam weights that maximize SINR includes using at least one of:
    minimum variance distortion-less response (MVDR) beamforming;
    space time adaptive processing (STAP) beamforming; or
    space time frequency adaptive processing (STFAP) beamforming.

13. The system of claim 11, wherein determining the maximum output SINR includes estimating the maximum output SINR using a closed form solution.

14. The system of claim 11, wherein determining the maximum output SINR further comprises applying the beam weights that maximize SINR to a model of the SOI and a model of the noise plus interference to determine the maximum output SINR.

15. The system of claim 11, wherein determining the maximum output SINR comprises:
    applying the beam weights that maximize SINR to the received signal to obtain signal samples; and
    determining the maximum output SINR using the obtained signal samples.

16. The system of claim 10, wherein determining the beam weights to achieve the target SINR comprises:
    estimating a correlation matrix of noise plus interference;
    estimating a steering vector for the SOI;
    determining a first basis vector using the correlation matrix and the estimated SOI steering vector;
    selecting a second basis vector;
    determining a target scale factor based on the target SINR and the estimated maximum output SINR;
    transforming a two-dimensional vector containing the target scale factor using the first and second basis vectors; and
    determining the beam weights using the transformed two-dimensional vector and the estimated correlation matrix.

17. The method of claim 16, wherein selecting the second basis vector comprises selecting the second basis vector with the object of minimally degrading a signal-to-noise ratio (SNR) of the SOI using a Gram-Schmidt technique.

18. The system of claim 10, wherein the multi-user detection unit is configured to recover the SOI using successive interference cancellation (SIC).

* * * * *